(12) United States Patent
Wu et al.

(10) Patent No.: US 10,055,095 B2
(45) Date of Patent: Aug. 21, 2018

(54) CUSTOMIZABLE AUTOCOMPLETE OPTION

(71) Applicant: EBAY INC., San Jose, CA (US)

(72) Inventors: Junlong Wu, Shanghai (CN); Shenyi Ge, Shanghai (CN)

(73) Assignee: EBAY INC., San Jose, CA (US)

( * ) Notice: Subject to any disclaimer, the term of this patent is extended or adjusted under 35 U.S.C. 154(b) by 290 days.

(21) Appl. No.: 14/985,073

(22) Filed: Dec. 30, 2015

(65) Prior Publication Data
US 2017/0192624 A1    Jul. 6, 2017

(51) Int. Cl.
| | | |
|---|---|---|
| *G06F 15/00* | (2006.01) | |
| *G06F 13/00* | (2006.01) | |
| *G06F 3/0482* | (2013.01) | |
| *G06F 17/30* | (2006.01) | |
| *G06F 17/27* | (2006.01) | |
| *G06F 3/023* | (2006.01) | |

(52) U.S. Cl.
CPC .......... *G06F 3/0482* (2013.01); *G06F 3/0237* (2013.01); *G06F 17/276* (2013.01); *G06F 17/30973* (2013.01)

(58) Field of Classification Search
CPC ............................ H04L 51/28; G06F 17/30103
USPC .......................................... 715/752, 763–765
See application file for complete search history.

(56) References Cited

U.S. PATENT DOCUMENTS

| | | | | |
|---|---|---|---|---|
| 2013/0275164 | A1* | 10/2013 | Gruber | G10L 17/22 705/5 |
| 2014/0359505 | A1* | 12/2014 | Cisler | G06F 17/30103 715/769 |
| 2015/0143255 | A1* | 5/2015 | Agrawal | H04L 51/28 715/752 |
| 2016/0092598 | A1* | 3/2016 | Mishra | G06F 17/30973 707/740 |

* cited by examiner

*Primary Examiner* — Kevin Nguyen
(74) *Attorney, Agent, or Firm* — Shook Hardy & Bacon L.L.P.

(57) ABSTRACT

A method may include determining a first autocomplete option with respect to a data-field of a graphical user interface (GUI) of an electronic device. The method may further include generating the first autocomplete option such that a plurality of characters of the first autocomplete option are individually selectable by a user action. The method may additionally include providing the first autocomplete option via the GUI.

20 Claims, 10 Drawing Sheets

CUSTOMIZABLE AUTOCOMPLETE OPTION

FIELD

The embodiments discussed in the present disclosure are related to customizable autocomplete options.

BACKGROUND

Graphical user interfaces often include data-fields where a user may enter information. Further, graphical user interfaces may include autocomplete options with respect to the data-fields. The autocomplete options may provide options of information that may automatically be entered in the data-fields.

BRIEF DESCRIPTION OF THE DRAWINGS

Example embodiments will be described and explained with additional specificity and detail through the use of the accompanying drawings in which.

DESCRIPTION OF EMBODIMENTS

A graphical user-interface (GUI) of an electronic device may include one or more data-fields where information may be entered based on user-input that may be based on a user action with respect to a user interface (e.g., keyboard, mouse, touchscreen, microphone (via voice recognition), etc.). Often, the GUI may include autocomplete options that may be used to populate the data-fields. The autocomplete options may include data (e.g., terms or characters) previously entered in the corresponding data-field, data related to data currently being entered by the user (e.g., via the user interface), or any other data that may be relevant to the data-field. Often, the autocomplete options are included in a drop-down box that may allow for selection of a particular autocomplete option that may be used to populate the data-field. The GUI typically only allows for selection of an entire autocomplete option without any modification of the autocomplete option. However, users may desire to modify an autocomplete option or select a portion of the autocomplete option without selecting the entire autocomplete option to obtain other autocomplete options or to filter results.

According to one or more embodiments of the present disclosure, an autocomplete module may be configured to generate one or more autocomplete options. The autocomplete module may be configured to generate the autocomplete options such that a portion of the autocomplete options may be selectable without selecting the entire autocomplete option. In these or other embodiments, the autocomplete module may be configured to generate the autocomplete options such that a selected portion may be modified by the user. Additionally or alternatively, the autocomplete module may be configured to generate one or more other autocomplete options based on selection of a portion of a particular autocomplete option.

Figure 1A:
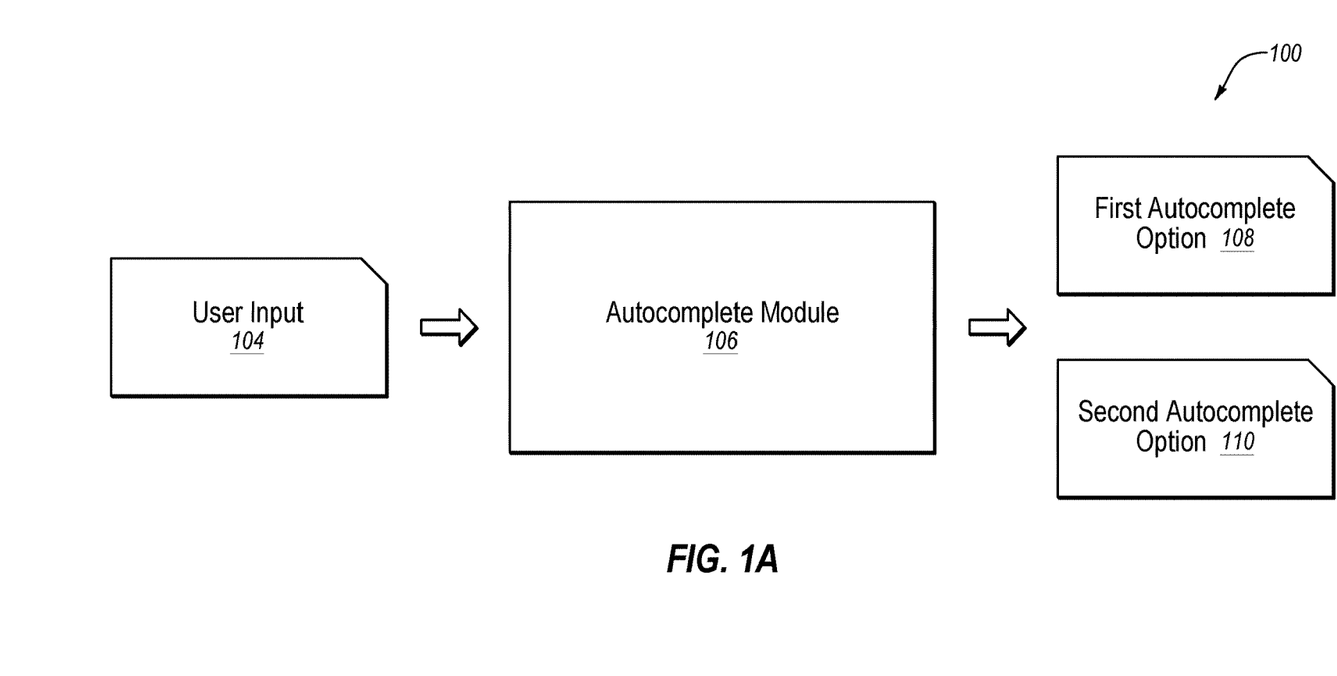
FIG. 1A illustrates an example system configured to generate portion-selectable autocomplete options.

Turning to the figures, FIG. 1A illustrates an example system 100 configured to generate portion-selectable autocomplete options, according to one or more embodiments of the present disclosure. In the present example, the system 100 may include an autocomplete module 106 configured to receive user input 104. As detailed below, the autocomplete module 106 may be configured to generate a first portion-selectable autocomplete option 108 (referred to hereinafter as the "first autocomplete option 108"). Additionally or alternatively, the autocomplete module 106 may be configured to generate a second portion-selectable autocomplete option 110 (referred to hereinafter as the "second autocomplete option 110") based on the user input 104 and the first autocomplete option 108 in some embodiments.

The autocomplete module 106 may include code and routines configured to generate the first autocomplete option 108 and/or the second autocomplete option 110. Additionally or alternatively, the autocomplete module 106 may be implemented using hardware including a processor, a microprocessor (e.g., to perform or control performance of one or more operations), a field-programmable gate array (FPGA), or an application-specific integrated circuit (ASIC). In some other instances, the autocomplete module 106 may be implemented using a combination of hardware and software. In the present disclosure, operations described as being performed by the autocomplete module 106 may include operations that the autocomplete module 106 may direct a corresponding system to perform.

The user input 104 may include any command or information that may be based on a user action that may be performed with respect to a user interface. For example, the user input 104 may include information or commands received based on key strokes of a keyboard, clicks of buttons of a mouse or track pad with respect to a GUI, touches on a touchscreen with respect to a GUI, voice commands received via a microphone, etc.

As mentioned above, the autocomplete module 106 may be configured to generate the first autocomplete option 108 based on the user input 104. For example, the user input 104 may include an indication that data may be entered in a data-field of a GUI. In some embodiments, the indication may be based on the user clicking a mouse when the corresponding mouse cursor is at the data-field. Additionally or alternatively, the indication may include the user tapping a touchscreen at a corresponding location of the data-field. In these or other embodiments, the autocomplete module 106 may be configured to generate the first autocomplete option 108 based on data entered into the data-field by the user using a keyboard, touchscreen, voice recognition applications, etc.

The autocomplete module 106 may be configured to determine what characters to include in the first autocomplete option 108 based on the user input 104 in some embodiments. The autocomplete module 106 may be configured to determine which characters to include in the first autocomplete option 108 using any suitable method or technique. For example, the autocomplete module 106 may be configured to determine the characters based on previous entries in the data-field, the type of information that may be included in the data-field, etc. Additionally, the autocomplete module 106 may be configured to generate any number of autocomplete options based on the user input. In some embodiments, the autocomplete module 106 may be configured to generate the first autocomplete option 108 (or other autocomplete options) by obtaining information (e.g., characters) for the first autocomplete option 108 (or for other autocomplete options) from a separate autocomplete generation module.

In some embodiments, the autocomplete module 106 may be configured to include the first autocomplete option 108 in a first list of autocomplete options. One or more of the other autocomplete options of the first list may be generated in a manner similar to generation of the first autocomplete option 108.

Figure 1B:
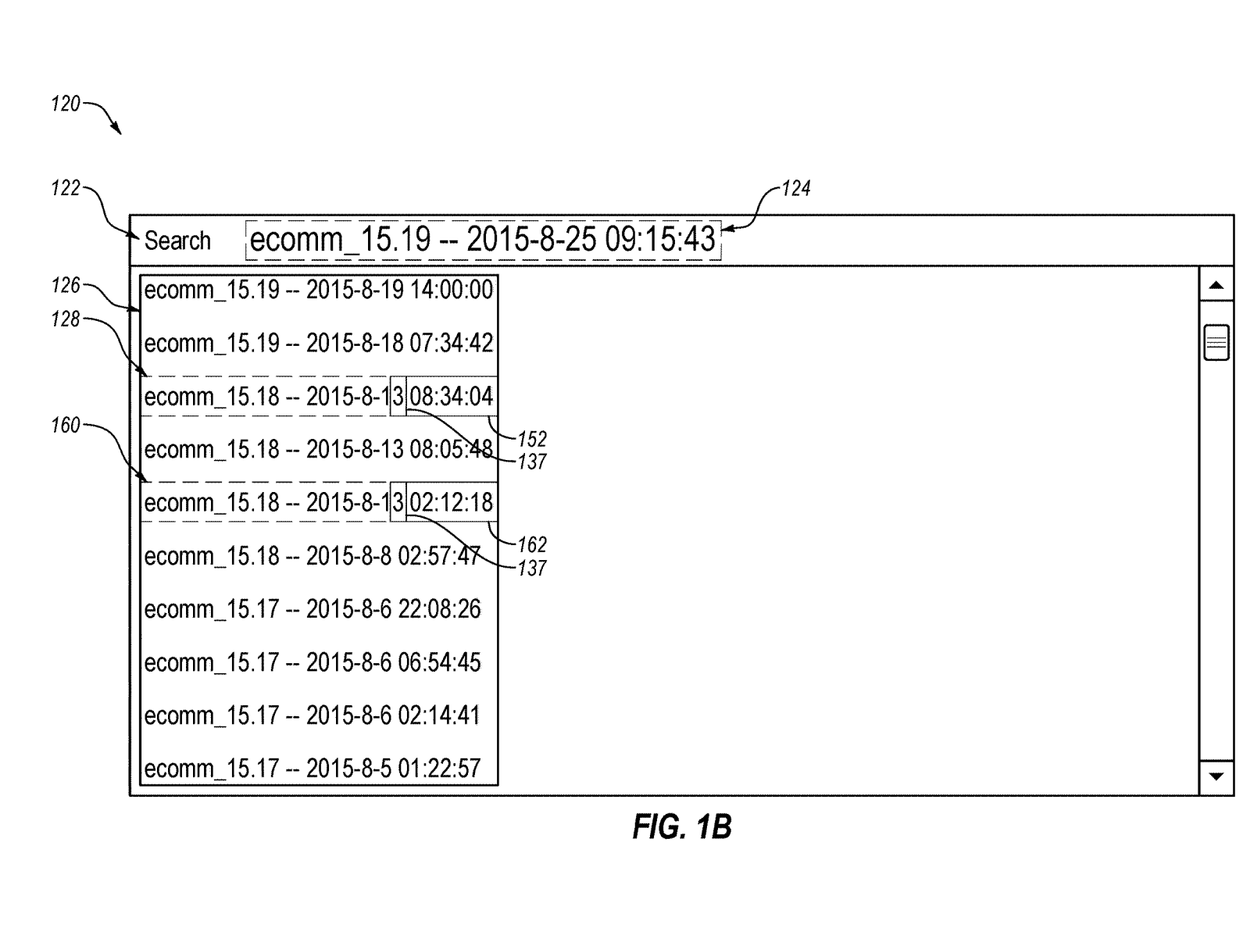
FIG. 1B illustrates an example GUI that may include multiple portion-selectable autocomplete options for a data-field.

FIG. 1B illustrates an example GUI 120 that may include multiple autocomplete options for a data-field, according to one or more embodiments of the present disclosure. In particular, the GUI 120 may include a data-field 122 that may be configured to be populated with data. In the present example, the data-field 122 may be configured as a search box. Additionally, the data-field 122 may be populated with a current option 124 that may include series of characters. In some embodiments, the characters of the current option 124 may have been entered by the user via a user interface. Additionally, the GUI 120 may include a first list 126 of autocomplete options. The autocomplete options of the first list 126 may have been generated by the autocomplete module 106 based on the current option 124 in some embodiments.

Returning to FIG. 1A, the autocomplete module 106 may also be configured to generate the first autocomplete option 108 such that a portion of the first autocomplete option 108 may be selectable. For example, one or more characters of the first autocomplete option 108 may be individually or collectively selectable. In these or other embodiments, every character of the first autocomplete option 108 may be collectively or individually selectable.

Additionally or alternatively, the autocomplete module 106 may be configured to generate the first autocomplete option 108 such that a portion of the autocomplete option 108 may be modified. For example, the first autocomplete option 108 may be configured such that one or more of its selectable characters may be modified by a command included in the user input 104 after being selected. Additionally or alternatively, the first autocomplete option 108 may be configured such that one or more characters may be inserted or deleted based on a command that may be included in the user input 104. In these or other embodiments, the autocomplete module 106 may be configured to allow for the insertion of wildcard characters to include multiple conjugations or similar words.

Figure 1C:
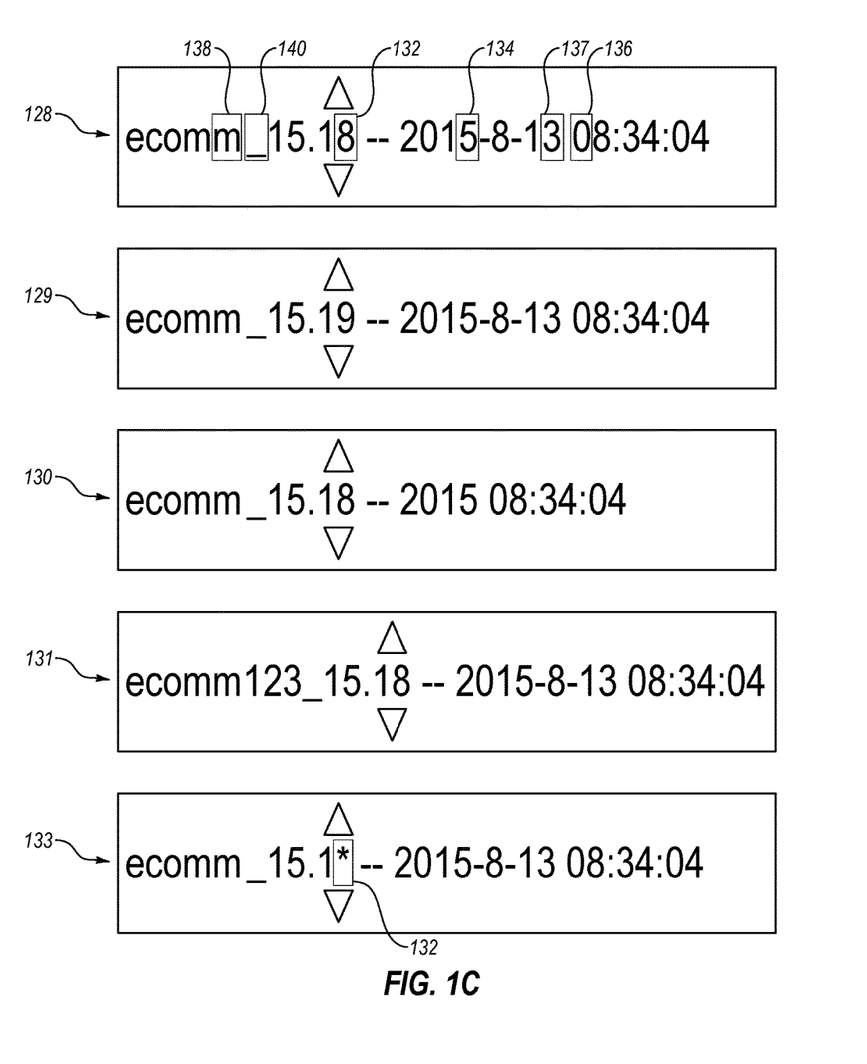
FIG. 1C illustrates example portion-selectable autocomplete options.

FIG. 1C illustrates an example autocomplete option 128 that may be included in the first list 126 of FIG. 1B. The autocomplete option 128 may be an example of the first autocomplete option 108 of FIG. 1A. The autocomplete option 128 may include characters that may be individually or collectively selectable. Further, the autocomplete option 128 may be configured such that it may be modified.

For example, a character 132 of the autocomplete option 128 may be selectable and modifiable. Further, the character 132 may be selected and may be modified based on user input. In the particular example, the character 132 may include a number with a value (e.g., "8") and may be modifiable based on the user clicking (e.g., via a user interface) one of the arrows above or below the character 132. By way of example, the user may click the top arrow once such that the value of the character 132 may change from "8" to "9," such that the autocomplete option 128 may be modified into an autocomplete option 129.

As another example, a character string "-8-13" of the autocomplete option 128 that may be between a character 134 and a character 136 of the autocomplete option 128 may be deleted based on a user action such that the autocomplete option 128 may be modified into an autocomplete option 130. As another example, a character string "123" may be inserted between a character 138 and a character 140 of the autocomplete option 128 based on a user action such that the autocomplete option 128 may be modified into an autocomplete option 131.

As another example, the value "8" of the character 132 may be replaced by an "*" that may be used as a wildcard character to indicate that any applicable value may be acceptable for the character 132. The result may be that the autocomplete option 128 may be modified into an autocomplete option 133. The autocomplete option 128 may be modified any number of different ways. The above-referenced modifications are only examples.

Returning to FIG. 1A, the autocomplete module 106 may be configured to generate the second autocomplete option 110 based on the first autocomplete option 108 and the user input 104. For example, in some embodiments, the autocomplete module 106 may be configured to generate the second autocomplete option 110 based on and in response to selection of the first autocomplete option 108 and based on and in response to selection of one or more characters of the first autocomplete option 108 and/or modification of the first autocomplete option 108. In some embodiments, the selection of the character and of the first autocomplete option 108 and/or the modification of the first autocomplete option 108 may be indicated by the user input 104.

In particular, in some embodiments, the autocomplete module 106 may be configured to generate the second autocomplete option 110 such that it includes the user-selected character and the character string that precedes the user-selected character in the first autocomplete option 108. In these or other embodiments, the autocomplete module 106 may be configured to generate the second autocomplete option 110 such that it does not include one or more characters of the first autocomplete option 108. The characters that may be excluded from the second autocomplete module 106 may include the characters that follow a user-selected character of the first autocomplete option 108 in some embodiments.

Figure 1D:
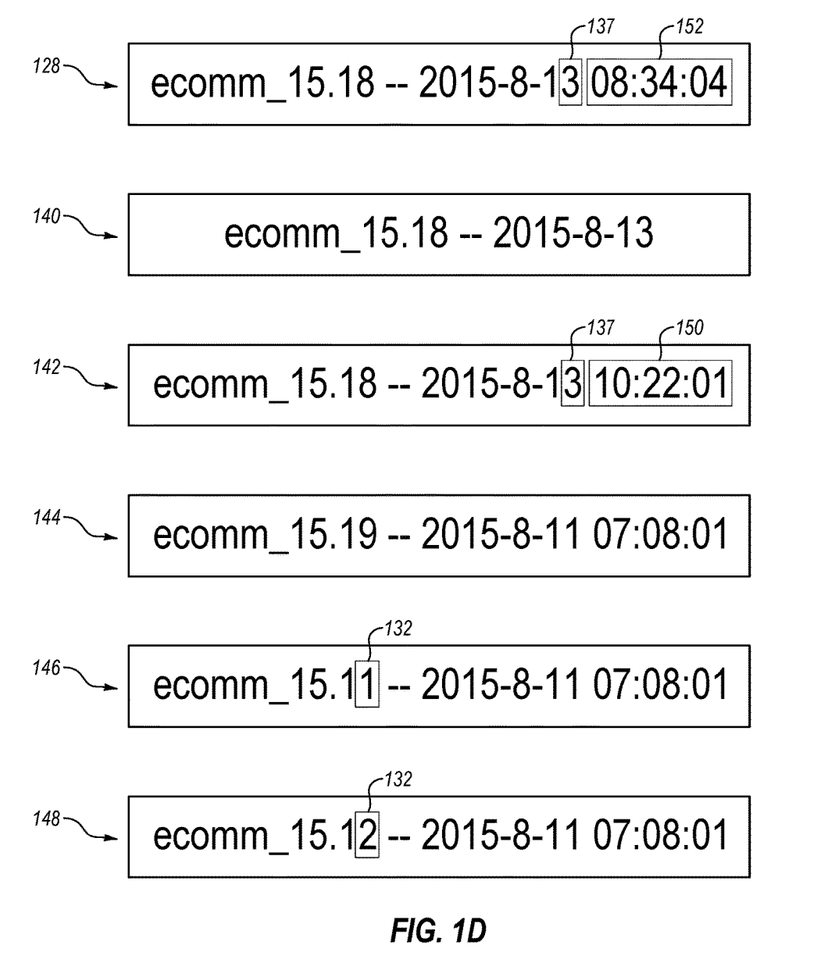
FIG. 1D illustrates more example portion-selectable autocomplete options.

By way of example, FIG. 1D illustrates an autocomplete option 140 that may be used as the second autocomplete option 110 in instances in which the autocomplete option 128 is the first autocomplete option 108. In particular, a character 137 of the autocomplete option 128 may be the user-selected character. The autocomplete option 140 may include the same character values as the autocomplete option 128 up to the character 137 and may not include any characters that may follow the character 137.

Additionally or alternatively, the autocomplete module 106 may be configured to generate the second autocomplete option 110 such that it includes a character string that follows the user-selected character that is different from a character string of the first autocomplete option 108 that follows the user-selected character. By way of example, FIG. 1D illustrates an autocomplete option 142 that may be used as the second autocomplete option 110 in instances in which the autocomplete option 128 is the first autocomplete option 108. In particular, the character 137 of the autocomplete option 128 may be the user-selected character. The autocomplete option 142 may include the same character values as the autocomplete option 128 up to the character 137 and may include a character string 150 that may follow the character 137 and that may be different from a character string 152 of the autocomplete option 128.

In these or other embodiments, the other characters in the second autocomplete option 110 may be based on a previous autocomplete option. For example, in some embodiments, the second autocomplete option 110 may be selected from the first list of autocomplete options that may have included the first autocomplete option 108. The selection may be based on the previous autocomplete option having the same string of characters as the first autocomplete option 108 with the added characters. As such, the other characters in the second autocomplete option 110 may be the other characters of the previous autocomplete option of the first list that may be selected as the second autocomplete option 110.

By way of example, an autocomplete option 160 of the first list 126 of FIG. 1B may be used as the second autocomplete option 110 in instances in which the autocomplete option 128 is the first autocomplete option 108. In particular, the character 137 of the autocomplete option 128 may be the user-selected character. The autocomplete option 160 may include the same characters as the autocomplete option 128 up to the character 137 and may include a character string 162 that may follow the character 137 and that may be different from a character string 152 of the autocomplete option 128.

Additionally or alternatively, the autocomplete module 106 may be configured to generate the second autocomplete option 110 to include one or more other user-added characters (as compared to characters of the first autocomplete option 108) in the second autocomplete option 110. In some embodiments, the other user-added characters may be based on and indicated by the user input 104. For example, the autocomplete option 128 of FIGS. 1B and 1C may be the first autocomplete option 108 and the autocomplete option 131 of FIG. 1C with the user-added character string "123" may be used as the second autocomplete option 110.

In these or other embodiments, the autocomplete module 106 may be configured to generate the second autocomplete option 110 based on modifications that may be made to the first autocomplete option 108. For example, FIG. 1D illustrates an example autocomplete option 144 that may be used as the second autocomplete option 110 in instances in which the autocomplete option 128 is the first autocomplete option 108 and has been modified to the autocomplete option 129 of FIG. 1C. In particular, the autocomplete option 144 may include the same character values as the autocomplete option 129 up to the character 132. In some embodiments, the autocomplete option 144 may include additional characters that may follow the character 132. In the illustrated example, the additional characters may have values that may differ from those that may follow the character 132 in the autocomplete option 129. However, in other embodiments, they may have the same values such that the second autocomplete option 110 may be the autocomplete option 129. In these or other embodiments, the second autocomplete option 110 may not include any other characters that may follow the character 137.

As another example, FIG. 1D illustrates example autocomplete options 146 and 148 that may be used as the second autocomplete option 110 in instances in which the autocomplete option 128 is the first autocomplete option 108 and has been modified to the autocomplete option 133 of FIG. 1C. In particular, the autocomplete options 146 and 148 may include potential values for the character 132 based on the wildcard indicator "*" being used as the value for the character 132 in the autocomplete option 133. Autocomplete options 146 and 148 are merely examples as any other possible values for the character 132 may be used to generate the second autocomplete option 110. Further, in the illustrated examples, the autocomplete options 146 and 148 may include additional characters that may follow the character 132. In these or other embodiments the additional characters may be based on the user input 104. In these or other embodiments, the autocomplete options 146 and 148 may be previous entries or previous autocomplete options that may be selected based on the wildcard indicator "*" and corresponding matching character strings. In other embodiments, the second autocomplete option 110 that may be derived based on the autocomplete option 133 may not include any other characters that may follow the character 132.

Returning to FIG. 1A, in some embodiments, the autocomplete module 106 may be configured to generate the second autocomplete option 110 such that it excludes one or more characters based on an indication to exclude the excluded characters. For example, the second autocomplete option 110 may include a character string that matches that of the first autocomplete option 108 but with the excluded characters removed from the character string of the first autocomplete option 108. In the present disclosure, such "matching" character string that does not include the excluded characters may be referred to as a "modified character string." In some embodiments, the modified character string of the second autocomplete option 110 may precede or follow the user-selected character in the second autocomplete option 110.

By way of example, in instances in which the autocomplete option 128 is the first autocomplete option 108, the autocomplete option 130 may be used as the second autocomplete option 110. In particular, the autocomplete option 130 as the second autocomplete option 110 may not include the character string "-8-13" based on the user input 104 indicating deletion of such. In these or other embodiments, with respect to the above example, the second autocomplete option 110 may include the character string "ecomm_15.18—2015 08:34:04" as well as any other character values or strings.

In some embodiments, the autocomplete module 106 may be configured to generate the second autocomplete option 110 such that a portion of the second autocomplete option 110 may be selectable and/or modifiable. In some embodiments, the autocomplete module 106 may configure the second autocomplete option 110 to have selectable and/or modifiable portions in an analogous manner as that described with respect to the first autocomplete option 108.

In some embodiments, the autocomplete module 106 may be configured to generate the second autocomplete option 110 by applying one or more filters to a general list of autocomplete options for the data-field or to a previously generated list of autocomplete options (e.g., the list 126 of FIG. 1B). In particular, the second autocomplete option 110 may be generated by selecting an autocomplete option from a corresponding list that may meet one or more criteria associated with the filters.

The filters and their associated criteria may be based on a user-selected character or modification. For example, the criteria may include having a same character string as a character string of the first autocomplete option 108 that includes a user-selected character and one or more characters that precede the user-selected character. As another example, the criteria may include having a same character string as a modified character string that includes a user-modified character and one or more characters that precede the user-modified character string. Other criteria may include any applicable property or principle described above with respect to generating the second autocomplete option 110 based on user selections or modifications.

Additionally or alternatively, in some embodiments, the autocomplete module 106 may be configured to include the second autocomplete option 110 in a second list of autocomplete options. In some embodiments, the second list of autocomplete options may include any number of autocomplete options that may be generated based on similar principles as the second autocomplete option 110. For example, each autocomplete option of the second list may be based on a user-selected character or a user based modification such as described above.

Figure 1E:
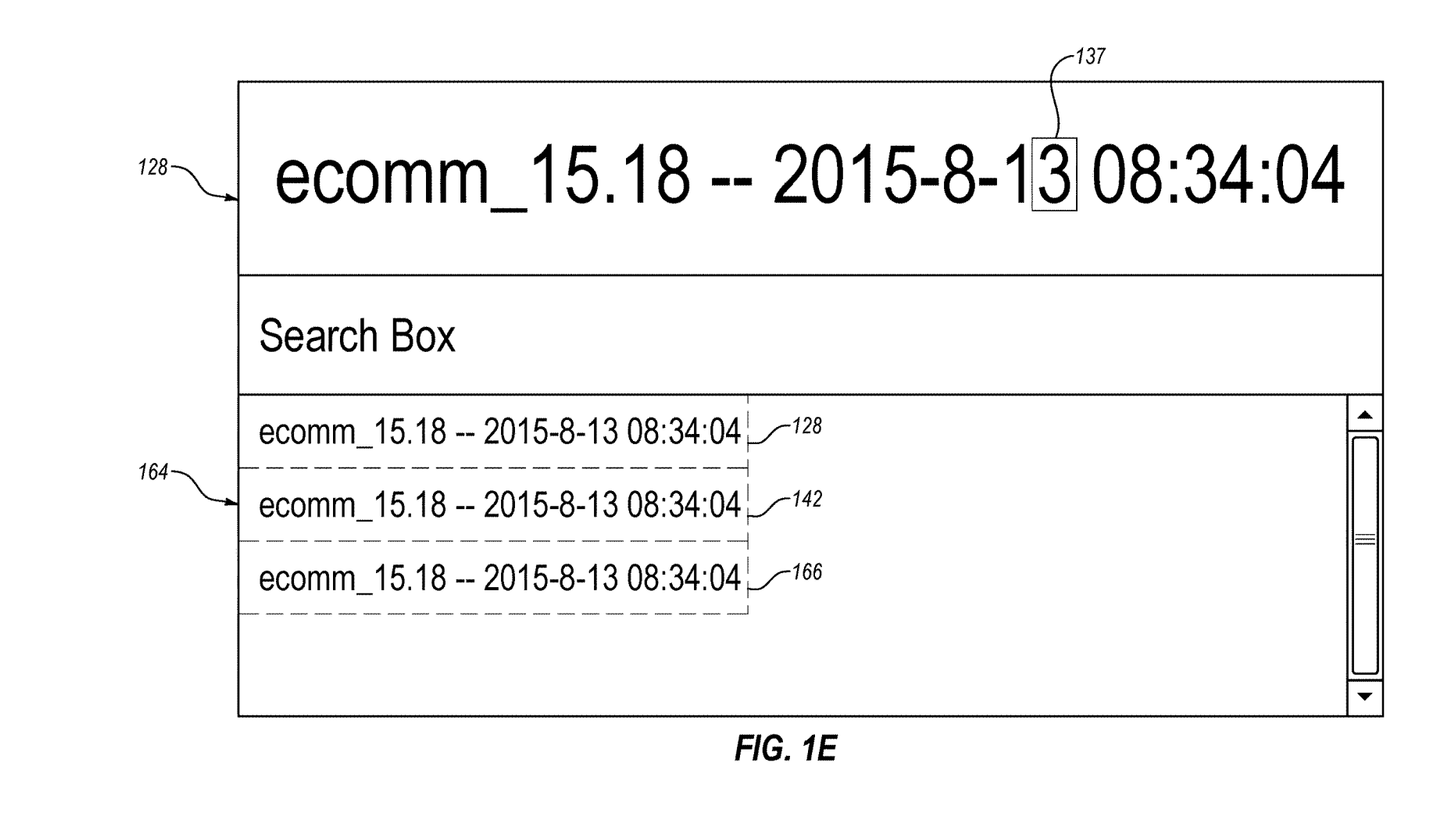
FIG. 1E illustrates an example autocomplete list.

By way of example, FIG. 1E includes an example second list 164 that may be generated based on selection of the character 137 of the autocomplete option 128 in which the autocomplete option 128 may be the first autocomplete option 110. In particular, the second list 164 may include the autocomplete option 128, the autocomplete option 142 discussed above with respect to FIG. 1D, and an autocomplete option 166. Each of the autocomplete options of the second list 164 may include the character string "ecomm_15.18—2015-8-13" and may be included in the second list 164 based on having such character string and based on the selection of the character 137, which may be indicated by user input (e.g., by the user input 104).

Figure 1F:
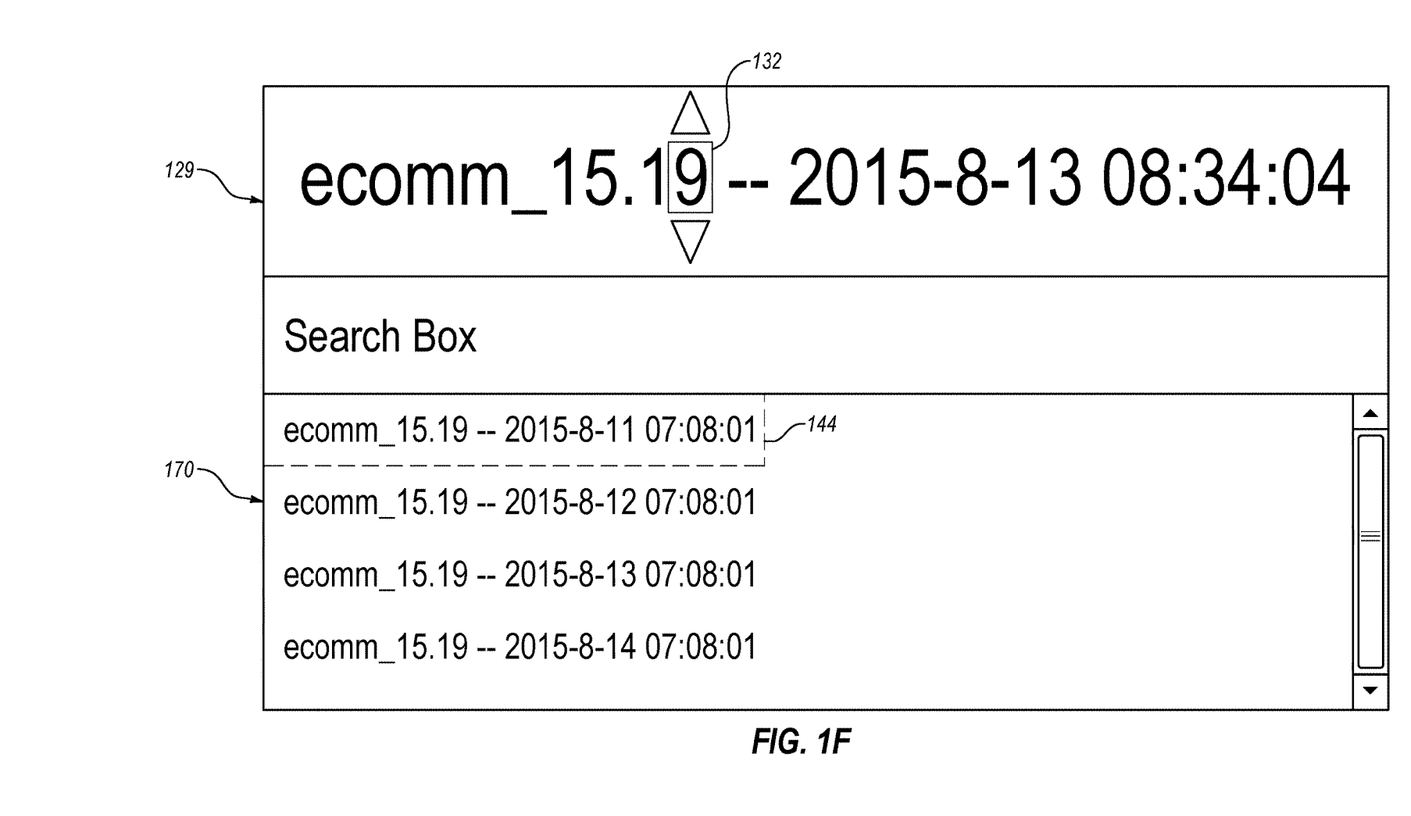
FIG. 1F illustrates another example autocomplete list.

As another example, FIG. 1F includes another example second list 170 that may be generated in which the autocomplete option 128 may be the first autocomplete option 110. The second list 170 may be based on a modification of the character 132 of the autocomplete option 128 that may generate the autocomplete option 129. In particular, the second list 170 may include the autocomplete option 144 discussed above with respect to FIG. 1D and other autocomplete options. Each of the autocomplete options of the second list 170 may include the character string "ecomm_15.19" and may be included in the second list 170 based on having such character string and based on the modification of the character 132, which may be indicated by user input (e.g., by the user input 104).

In some embodiments, the second list may be generated based on a modification of the first list that may be based on the user selection or modification. For example, the autocomplete options of the second lists 160 and 170 of FIGS. 1E and 1F may be generated by modifying the first list 126 of FIG. 1B. In particular, the first list 126 may be modified to generate the second lists 160 and 170 by filtering out autocomplete options that may not satisfy the criteria that may be associated with a user selection or modification. In these or other embodiments, the second list may be generated by filtering out autocomplete options that may be in a master list of autocomplete options that may not satisfy the criteria that may be associated with a user selection or modification. The criteria for the filtering may be analogous or similar to that described above.

In these or other embodiments, the second list may include one or more autocomplete options that may not have been included in the first list. Additionally or alternatively, in some embodiments, the new autocomplete options may be based on a user selection or modification that may result in generation of different autocomplete options that may not have been included in the first list.

In some embodiments, the autocomplete module 106 may be configured to populate the corresponding data-field with the second autocomplete option 110. In these or other embodiments, the population of the data-field with the second autocomplete option may be based on a user selection of the second autocomplete option 110 that may be indicated in the user input 104.

Therefore, according to one or more embodiments of the present disclosure, the autocomplete module 106 may be configured to generate and provide autocomplete options in a manner that may be more useful to a user than other autocomplete techniques. Modifications, additions, or omissions may be made to FIGS. 1A-1F without departing from the scope of the present disclosure. For example, the specific autocomplete options depicted and described are merely examples and are not limiting.

Figure 2:
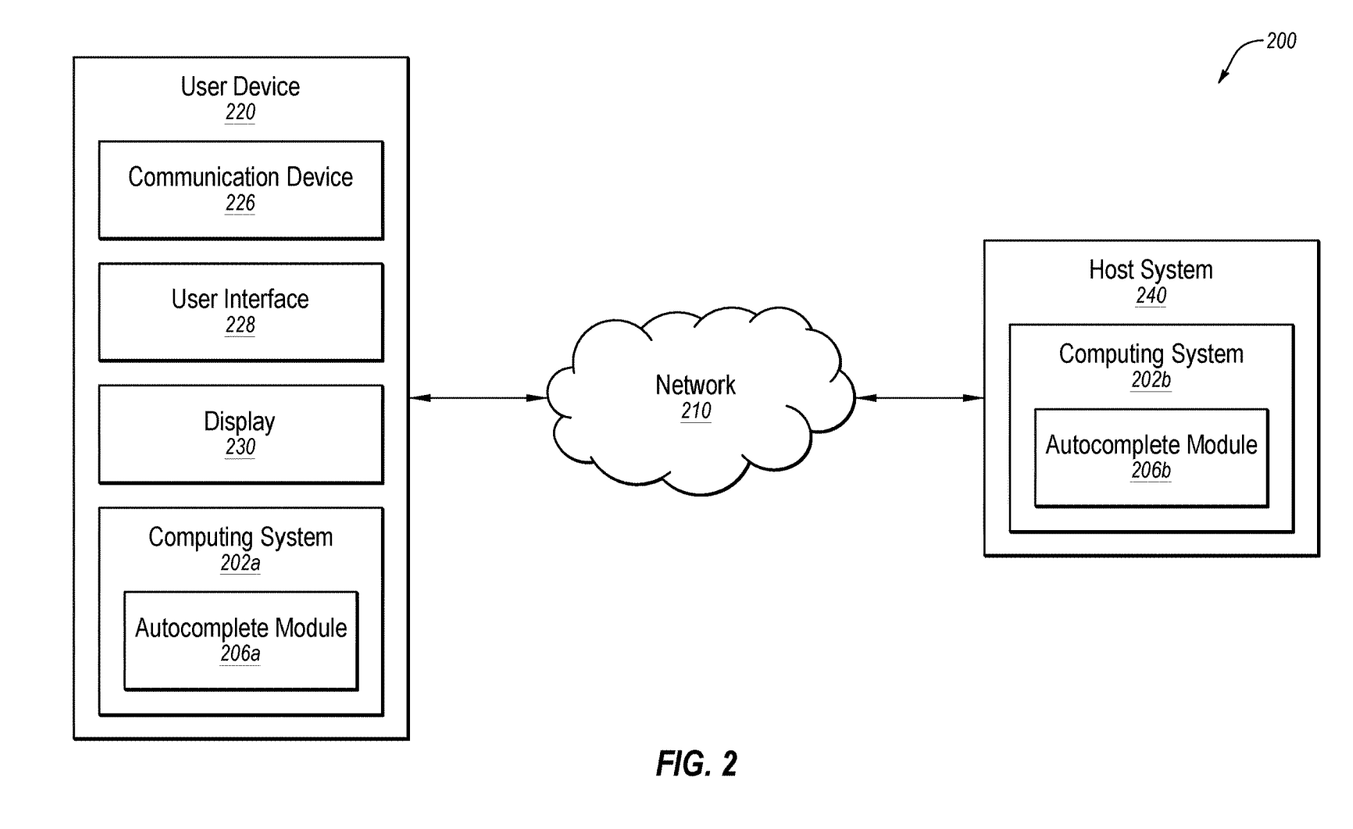
FIG. 2 illustrates a block diagram example system that may be configured to generate autocomplete options.

Further, the autocomplete module 106 may be included locally on a user device or may be included on a host system that may communicate information and instructions to the user device. For example, FIG. 2 illustrates a block diagram an example system 200 that may be configured to generate portion-selectable autocomplete options. The system 200 may be arranged in accordance with at least one embodiment described in the present disclosure. The system 200 may include a network 210; a user device 220 that includes a computing system 202a, a communication device 226, a user interface 228, and a display 230. The system 200 may also include a host system 202b that includes a computing system 202b. The computing system 202a may include an autocomplete module 206a in some embodiments. Additionally or alternatively, the computing system 202b may include an autocomplete module 206b. The autocomplete modules 202a and 202b may be analogous to the autocomplete module 106 of FIG. 1A. Further, the computing systems 202a and 202b may be analogous to a computing system 302 described below with respect to FIG. 3.

The network 210 may be configured to communicatively couple the host system 240 with the user device 220. In some embodiments, the network 210 may include any network or configuration of networks configured to send and receive communications between devices. In some embodiments, the network 210 may include a conventional type network, a wired or wireless network, and may have numerous different configurations. Furthermore, the network 210 may include a local area network (LAN), a wide area network (WAN) (e.g., the Internet), or other interconnected data paths across which multiple devices and/or entities may communicate. In some embodiments, the network 210 may include a peer-to-peer network. The network 210 may also be coupled to or may include portions of a telecommunications network for sending data in a variety of different communication protocols. In some embodiments, the network 210 may include Bluetooth® communication networks or cellular communication networks for sending and receiving communications and/or data including via short message service (SMS), multimedia messaging service (MMS), hypertext transfer protocol (HTTP), direct data connection, wireless application protocol (WAP), e-mail, etc. The network 210 may also include a mobile data network that may include third-generation (3G), fourth-generation (4G), long-term evolution (LTE), long-term evolution advanced (LTE-A), Voice-over-LTE ("VoLTE") or any other mobile data network or combination of mobile data networks. Further, the network 210 may include one or more IEEE 802.11 wireless networks.

In some embodiments, the host system 240 may include any configuration of hardware, such as servers and databases that are networked together and configured to perform a task. For example, the host system 240 may include a single computing system that includes one or more processors and memory, such as a server or some other computing system configured to perform operations as described in this disclosure. Alternately or additionally, the host system 240 may include multiple computing systems, such as multiple servers, that are networked together and configured to perform operations as described in this disclosure. In the illustrated embodiment, the computing system 202b may be configured to direct the operations of host system 240.

In some embodiments, the host system 240 may include a web server that hosts webpages of a website that are accessed through URLs. In these and other embodiments, the host system 240 may include code, such as HTML and javascript code that may be provided to devices based on received requests. The host system 240 may further provide additional data as requested from a device based on instructions from the code provided by the host system 240 executed on the device. For example, the user device 220 may send a request with a URL of a webpage. The host system 240 may respond to the request by sending code to the user device 220. Execution of the code by the user device 220 may cause the user device 220 to request further data with respect to the webpage, such as images, listings, or other data from the host system 240. The host system 240 may access the requested data and send the data to the user device 220.

The user device 220 may include any electronic device configured to receive user input and to present autocomplete options to a user. In some embodiments, the user device 220 may be configured to provide access to the host system 240. By way of example, the user device 220 may include a desktop computer, a laptop computer, a smartphone, a mobile phone, a tablet computer, or any other suitable processing device.

The communication device 226 may include any component, device, system, or combination thereof that is configured to transmit or receive information over the network 210 or over other networks or systems. In some embodiments, the communication device 226 may communicate with other devices at other locations, the same location, or even other components within the same system. For example, the communication device 226 may include a modem, a network card (wireless or wired), an infrared communication device, a wireless communication device (such as an antenna), and/or chipset (such as a Bluetooth device, an 802.6 device (e.g. Metropolitan Area Network (MAN)), a WiFi device, a WiMax device, cellular communication facilities, etc.), and/or the like. The communication device 226 may permit data to be exchanged with a network and/or any other devices described in the present disclosure.

In some embodiments, the user device 220 may be configured to receive input from a user and to present information and/or data to the user. For example, the user interface 228 of the user device 220 may include any component, device, system, or combination thereof that is configured to provide input from a user to the user device 220 via a user action. For example, the user interface 228 may include a mouse, a track pad, a touch screen, a keyboard, a microphone and corresponding voice recognition applications, or any other system or device that may interface with the device 220 to provide user input to the device 220. In some embodiments, the user may provide user input via the user interface 228.

In some embodiments, a user may interact with the user device 220 and direct the user device 220 to request a webpage from the host system 240. In these and other embodiments, the user may interact with the user device 220 through a browser. In some embodiments, the user may direct the user device 220 to request the webpage by providing the user device 220 with a URL of the webpage. Alternately or additionally, the user may use the user device 220 to determine the URL of the webpage and may direct the user device 220 to request the webpage from the host system 240.

In response to the direction of the user, the user device 220 may send the URL to the host system 240, via the communication device 226. The host system 240 may use the URL to identify the webpage requested. Based on the request, the host system 240 may provide code to the user device 220 over the network 210. The code may be HTML code. Alternately or additionally, the code may be any other type of coding language that may be used by a browser or other application to render webpages.

The user device 220 may receive the code via the communication device 226. Based on the received code, the user device 220, through an application such as a web browser, may present the webpage to the user through the display 230. Alternately or additionally, the user device 220 may present information from the webpage or the webpage using another medium, such as through audio or tactile response. In some embodiments, the code provided by the host system 240 may include client side code that may be executed by the user device 220. For example, the client side code may be javascript. The user device 220 may execute the client side code. Based on the execution of the client side code, the user may interact with the webpage to change a configuration of the webpage without navigating away from the webpage. In other words, the information presented on the display 230 through a web browser that is included on the webpage may change without the web browser navigating to a different URL.

For example, the webpage may include elements through which a user may interact with the webpage. The client-side code executed by the user device 220 may obtain the user interactions and change the configuration of the webpage accordingly. For example, the configuration of the webpage may change by changing the ordering or display of information presented on the webpage. Alternately or additionally, the client-side code may request additional data from the host system, such as images, item listings, or other information, for including in the webpage. In these and other embodiments, the client-side code may send the request to the host system 240, the host system 240 may respond with the data, and the client-side code may present the data in the webpage to the user.

In some embodiments, the autocomplete module 206b of the host system 240 may be configured to generate portion-selectable autocomplete options based on information communicated from the user device 220. Further, the host system 240 may be configured to communicate the autocomplete options to the user device 220 via the network 210. In some embodiments, the portion-selectable autocomplete options may be generated based on previous interactions of the user device 220 with the host system 240.

Additionally or alternatively, the autocomplete module 206a may be configured to generate one or more portion-selectable autocomplete options and may direct that they be presented to the user via the display 230. In some embodiments, the portion-selectable autocomplete options may be generated based on interactions with the host system 240. In these or other embodiments, the portion-selectable autocomplete options may be generated based on or with respect to operations or applications that may be performed locally on the user device 220.

Modifications, additions, or omissions may be made to the system 200 without departing from the scope of the present disclosure. For example, the system 200 may include multiple devices.

Figure 3:
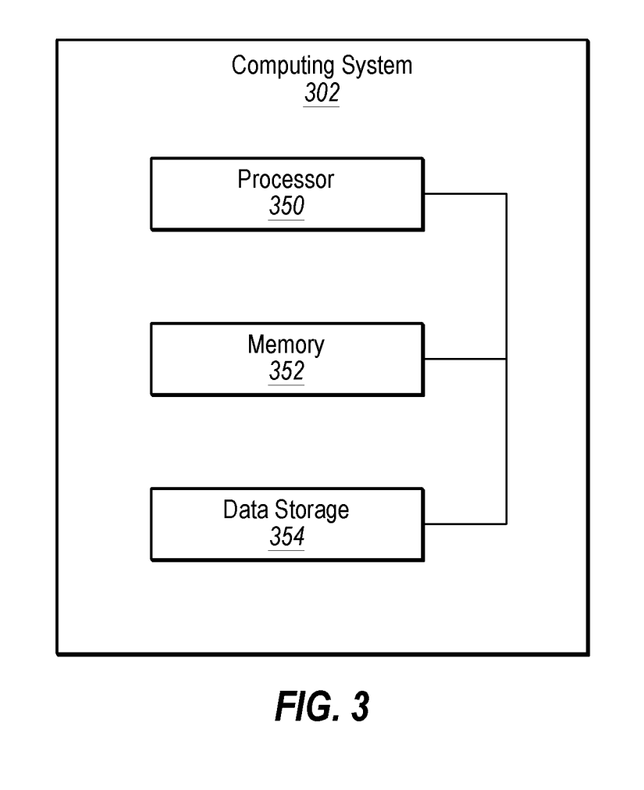
FIG. 3 illustrates a block diagram of an example computing system.

FIG. 3 illustrates a block diagram of an example computing system 302, according to at least one embodiment of the present disclosure. The computing system 302 may be an example implementation of the computing systems 202*a* and 202*b* of FIG. 2 and in some embodiments may be configured to implement one or more operations associated with the autocomplete module 106 of FIG. 1A. The computing system 302 may include a processor 350, a memory 352, and a data storage 354. The processor 350, the memory 352, and the data storage 354 may be communicatively coupled.

In general, the processor 350 may include any suitable special-purpose or general-purpose computer, computing entity, or processing device including various computer hardware or software modules and may be configured to execute instructions stored on any applicable computer-readable storage media. For example, the processor 350 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data. Although illustrated as a single processor in FIG. 3, the processor 350 may include any number of processors configured to perform, individually or collectively, any number of operations described in the present disclosure. Additionally, one or more of the processors may be present on one or more different electronic devices, such as different servers.

In some embodiments, the processor 350 may interpret and/or execute program instructions and/or process data stored in the memory 352, the data storage 354, or the memory 352 and the data storage 354. In some embodiments, the processor 350 may fetch program instructions from the data storage 354 and load the program instructions in the memory 352. After the program instructions are loaded into memory 352, the processor 350 may execute the program instructions.

For example, in some embodiments, an autocomplete module (e.g., the autocomplete module 106, 206*a*, or 206*b* of FIGS. 1A and 2) may be included in the data storage 354 as program instructions. The processor 350 may fetch the program instructions of the autocomplete module from the data storage 354 and may load the program instructions of the autocomplete module in the memory 352. After the program instructions of the autocomplete module are loaded into memory 352, the processor 350 may execute the program instructions such that the computing system 302 may implement the operations associated with the autocomplete module as directed by the instructions.

The memory 352 and the data storage 354 may include computer-readable storage media for carrying or having computer-executable instructions or data structures stored thereon. Such computer-readable storage media may include any available media that may be accessed by a general-purpose or special-purpose computer, such as the processor 350.

By way of example, and not limitation, such computer-readable storage media may include tangible or non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the processor 250 to perform a certain operation or group of operations.

Modifications, additions, or omissions may be made to the computing system 302 without departing from the scope of the present disclosure. For example, in some embodiments, the computing system 302 may include any number of other components that may not be explicitly illustrated or described.

Figure 4:
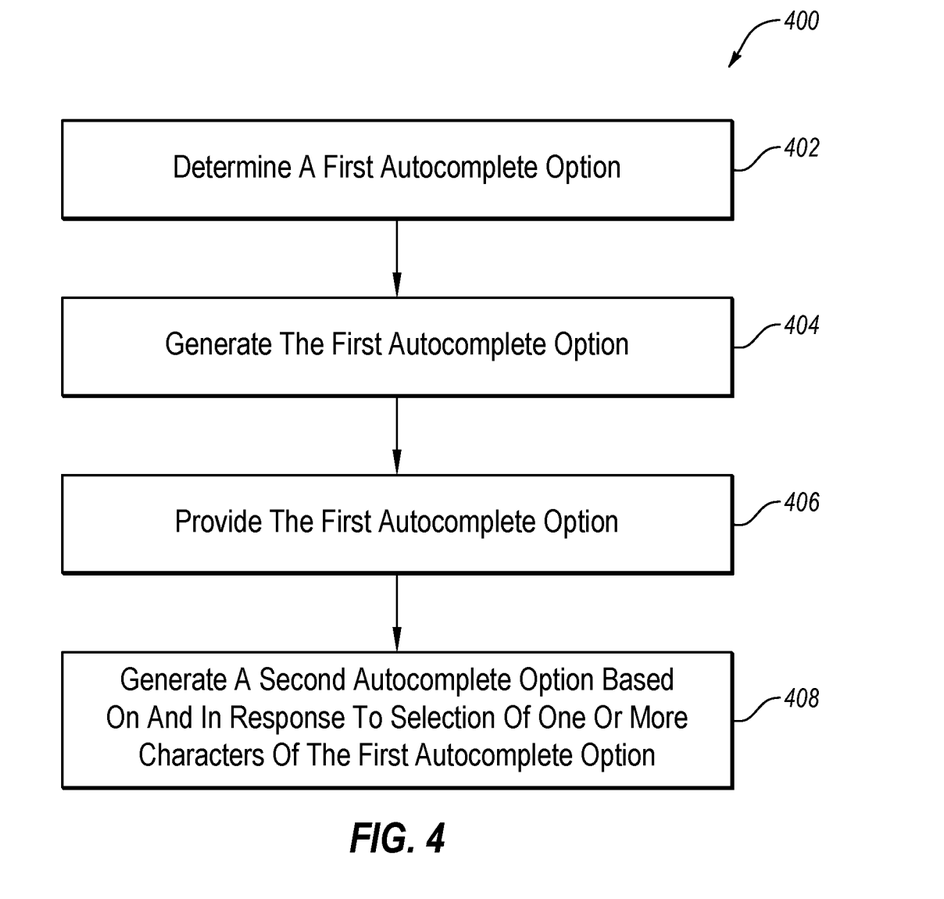
FIG. 4 is a flowchart of an example method of generating autocomplete options.

FIG. 4 is a flowchart of an example method 400 of generating autocomplete options, according to at least one embodiment described in the present disclosure. The method 400 may be implemented, in some embodiments, by a computing system as instructed by an autocomplete module. Although illustrated as discrete blocks, various blocks may be divided into additional blocks, combined into fewer blocks, or eliminated, depending on the particular implementation.

The method 400 may begin, and at block 402, a first autocomplete option may be determined with respect to a data-field of a GUI of an electronic device. The first autocomplete option may be determined using any suitable method or technique.

At block 404, the first autocomplete option may be generated such that multiple characters of the first autocomplete option are individually selectable by a user action. The first autocomplete option may be generated such that the individually selectable characters may also be modifiable in some embodiments. At block 406, the first autocomplete option may be provided via the GUI.

At block 408, a second autocomplete option may be generated based on and in response to selection of the first autocomplete option and based on and in response to selection one or more of the characters of the first autocomplete option. In some embodiments, the selection may be indicated by user input generated based on one or more user actions. The second autocomplete option may be generated based on one or more principles described above with respect to FIGS. 1A-1F.

For example, generating the second autocomplete option may include excluding, from the second autocomplete option, one or more characters of the first autocomplete option that follow a user-selected character of the first autocomplete option. Additionally or alternatively, generating the second autocomplete option may include including, in the second autocomplete option every character of the first autocomplete option that precedes the user-selected character.

In these or other embodiments, generating the second autocomplete option may include including one or more new characters in the second autocomplete option following the user-selected character. The one or more new characters may be different from one or more characters that follow the user-selected character in the first autocomplete option. In some embodiments one or more of the new characters may be based on and indicated by a user input. In these or other embodiments, one or more of the new characters may be based on a previous autocomplete option or an autocomplete option included in a general list of autocomplete options. Additionally or alternatively, one or more of the new characters may be based on data that may have been previously entered into the data-field.

As another example, in some embodiments, generating the second autocomplete option may include excluding one or more characters of the first autocomplete option from the second autocomplete option in response to the user input indicating deletion of the one or more characters. Further, in some embodiments, generating the second autocomplete option may include modifying a user-selected character of the first autocomplete option based on the user input and generating the second autocomplete option to include the modification. Additionally or alternatively, the second autocomplete option may be generated based on filtering such as described above in some embodiments.

Modifications, additions, or omissions may be made to the method 400 without departing from the scope of the present disclosure. For example, the functions and operations described with respect to the method 400 may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

For instance, the method 400 may further include populating the data-field with the second autocomplete option. In these or other embodiments, the population of the data-field with the second autocomplete option may be based on the user input.

Figure 5:
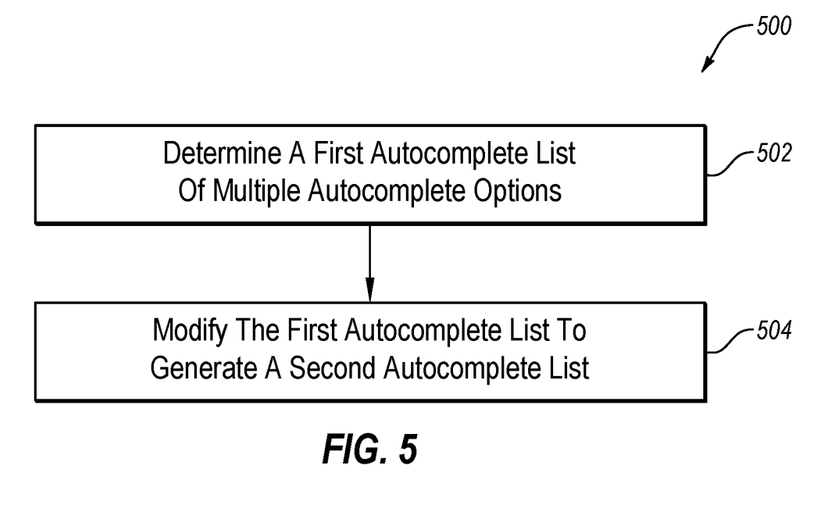
FIG. 5 is a flowchart of an example method 500 of generating a list of autocomplete options.

FIG. 5 is a flowchart of an example method 500 of generating a list of autocomplete options, according to at least one embodiment described in the present disclosure. The method 500 may be implemented, in some embodiments, by a computing system as instructed by an autocomplete module. Although illustrated as discrete blocks, various blocks may be divided into additional blocks, combined into fewer blocks, or eliminated, depending on the particular implementation.

The method 500 may begin, and at block 502, a first autocomplete list that includes one or more autocomplete options with respect to a data-field of a GUI may be generated. In some embodiments, each of the autocomplete options of the list may include one or more characters that are individually selectable by a user action. In some embodiments, the first autocomplete list may be generated based on a current user input with respect to the data-field. In these or other embodiments, the first autocomplete list may include a general autocomplete list that may be generated based on one or more previous user inputs with respect to the data-field.

At block 504, the first autocomplete list may be modified to generate a second autocomplete list. In some embodiments, the first autocomplete list may be modified to generate the second autocomplete list based on and in response to selection of a character of a selected autocomplete option of the autocomplete list. The selection may be indicated by user input that may be generated based on a user action in some embodiments. The second autocomplete list may be generated based on one or more principles described above with respect to FIGS. 1A-1F.

For example, the selected autocomplete option may include a preceding portion that includes the selected character and every character that precedes the selected character. In some embodiments, modifying the first autocomplete list to generate the second autocomplete list may include excluding from the second autocomplete list autocomplete options of the first autocomplete list that do not have portions that match the preceding portion.

As another example, the selected character may be modified based on the user input. In these or other embodiments, a preceding portion that includes the modified selected character and every character that precedes the modified selected character in the selected autocomplete option may be determined. In some embodiments, modifying the first autocomplete list to generate the second autocomplete list includes excluding from the second autocomplete list autocomplete options of the first autocomplete list that do not have portions that match the preceding portion with the modified character.

In some embodiments, a new autocomplete option may be included in the second autocomplete list that was not included in the first autocomplete list. In some embodiments, the new autocomplete option may be based on the selected character or a modification of the selected character. In these or other embodiments, the new autocomplete option may be based on the user input indicating insertion of additional characters into the selected autocomplete option or deletion of characters from the selected autocomplete option.

Modifications, additions, or omissions may be made to the method 500 without departing from the scope of the present disclosure. For example, the functions and operations described with respect to the method 500 may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

For instance, the method 500 may further include populating the data-field with an autocomplete option from the second autocomplete list. In these or other embodiments, the population of the data-field with the autocomplete option may be based on the user input.

In some embodiments, the different components, modules, engines, and services described in the present disclosure may be implemented as objects or processes that execute on a computing system (e.g., as separate threads). While some of the system and methods described in the present disclosure are generally described as being implemented in software (stored on and/or executed by general purpose hardware), specific hardware implementations or a combination of software and specific hardware implementations are also possible and contemplated.

Terms used in the present disclosure and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an"

limits any particular claim containing such introduced claim recitation to embodiments containing only one such recitation, even when the same claim includes the introductory phrases "one or more" or "at least one" and indefinite articles such as "a" or "an" (e.g., "a" and "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc. For example, the use of the term "and/or" is intended to be construed in this manner.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

All examples and conditional language recited in the present disclosure are intended for pedagogical objects to aid the reader in understanding the invention and the concepts contributed by the inventor to furthering the art, and are to be construed as being without limitation to such specifically recited examples and conditions. Although embodiments of the present disclosure have been described in detail, it should be understood that the various changes, substitutions, and alterations could be made hereto without departing from the spirit and scope of the present disclosure.

What is claimed is:

1. A computer-implemented method comprising:
    determining a first autocomplete option with respect to a data-field of a graphical user interface (GUI) of an electronic device;
    generating the first autocomplete option such that a plurality of characters of the first autocomplete option are individually selectable by a user action;
    providing the first autocomplete option via the GUI; and
    generating a second autocomplete option based on and in response to selection of the first autocomplete option and based on and in response to selection one or more of the plurality of characters of the first autocomplete option, wherein the selection of the first autocomplete option and the selection of the one or more of the plurality of characters are indicated by user input generated based on one or more user actions including the user action with respect to a character of the plurality of characters, and wherein the one or more of the plurality of characters is a subset of the plurality of characters.

2. The method of claim 1, wherein generating the second autocomplete option includes excluding, from the second autocomplete option, one or more characters of the first autocomplete option that follow a user-selected character of the first autocomplete option, based on the user-selected character being part of the selection of the one or more of the plurality of characters.

3. The method of claim 2, wherein generating the second autocomplete option further includes including, in the second autocomplete option, every character of the first autocomplete option that precedes the user-selected character based on the user-selected character being part of the selection of the one or more of the plurality of characters.

4. The method of claim 2, wherein generating the second autocomplete option further includes including one or more new characters in the second autocomplete option following the user-selected character based on the user-selected character being part of the selection of the one or more of the plurality of characters, wherein the one or more new characters are different from one or more characters that follow the user-selected character in the first autocomplete option.

5. The method of claim 4, wherein the one or more new characters are indicated by the user input.

6. The method of claim 4, wherein the one or more new characters are based on a previous autocomplete option.

7. The method of claim 4, wherein the one or more new characters are based on previously entered data in the data-field.

8. The method of claim 1, wherein generating the second autocomplete option includes modifying a user-selected character of the first autocomplete option based on the user input.

9. The method of claim 1, wherein generating the second autocomplete option further includes excluding a first set of characters of the first autocomplete option from the second autocomplete option and including a second set of the characters of the first autocomplete option in the second autocomplete option in response to the user input indicating deletion of the first set of the characters.

10. The method of claim 1, further comprising generating one or more additional autocomplete options based on the second autocomplete option, wherein the one or more additional autocomplete options include every character included in the second autocomplete option and exclude the subset of the plurality of characters based on the subset of the plurality of characters being identified by the user action.

11. The method of claim 1, further comprising populating the data-field with the second autocomplete option.

12. The method of claim 1, wherein the user action is to a graphical interface element that is positioned relative to the character in the GUI, and the user action to the graphical interface element increments the character.

13. A computer-implemented method comprising:
    generating a first autocomplete list of a plurality of autocomplete options with respect to a data-field of a graphical user interface (GUI) of an electronic device, wherein each of the plurality of autocomplete options includes a plurality of characters that are individually selectable by a user action to the first autocomplete list displayed in the GUI;
    modifying, to generate a second autocomplete list, a single character in a selected autocomplete option of the plurality of autocomplete options in the first autocomplete list based on and in response to selection, by the user action, of the single character, wherein the selection is indicated by user input generated based on one or more user actions and the selection includes a subset of the plurality of characters of the selected autocomplete option;
    generating the second autocomplete list based on and in response to the single character being part of the selection; and
    providing the second autocomplete list to the GUI.

14. The method of claim 13, wherein the selected autocomplete option includes a preceding portion that includes the single character and every character that precedes the single character and wherein generating the second autocomplete list includes excluding from the second autocomplete list autocomplete options of the first autocomplete list that do not have portions that match the preceding portion based on and in response to the single character being part of the selection.

15. The method of claim 13, further comprising:
determining a preceding portion of the selected autocomplete option that includes the modified single character and every character that precedes the modified single character in the selected autocomplete option; and wherein generating the second autocomplete list includes excluding from the second autocomplete list autocomplete options of the first autocomplete list that do not have portions that match the preceding portion based on and in response to the single character being part of the selection.

16. The method of claim 13 further comprising including a new autocomplete option in the second autocomplete list that is not included in the first autocomplete list based on the single character.

17. The method of claim 13, wherein generating the second autocomplete list comprises filtering out autocomplete options from a master list that fail to satisfy criteria associated with the single character based on and in response to the single character being part of the selection.

18. A computer-implemented method comprising:
determining a first autocomplete option with respect to a data-field of a graphical user interface (GUI) of an electronic device;
generating the first autocomplete option such that a plurality of characters of the first autocomplete option are individually selectable by a user action;
providing the first autocomplete option via the GUI; and
determining a second autocomplete option based on and in response to selection of the first autocomplete option in the GUI and based on and in response to selection of an individual character of the plurality of characters of the first autocomplete option by the user action, wherein the selection of the first autocomplete option and the selection of the individual character are indicated by user input to the GUI.

19. The method of claim 18, wherein determining the second autocomplete option includes filtering out autocomplete options from a master list that fail to satisfy criteria associated with the individual character based on and in response to the individual character being part of the selection.

20. The method of claim 18, wherein determining the second autocomplete option includes excluding, from the second autocomplete option, one or more characters of the first autocomplete option that follow the individual character of the first autocomplete option based on and in response to the individual character being part of the selection.

* * * * *